W. W. TURNBULL.
METHOD AND APPARATUS FOR FEEDING BATTER TO A BAKING MACHINE.
APPLICATION FILED NOV. 1, 1911.

1,202,247. Patented Oct. 24, 1916.
3 SHEETS—SHEET 1.

W. W. TURNBULL.
METHOD AND APPARATUS FOR FEEDING BATTER TO A BAKING MACHINE.
APPLICATION FILED NOV. 1, 1911.

1,202,247.

Patented Oct. 24, 1916.
3 SHEETS—SHEET 2.

Witnesses

Inventor
Ward W. Turnbull
By
C. D. Shepherd
Attorney.

W. W. TURNBULL.
METHOD AND APPARATUS FOR FEEDING BATTER TO A BAKING MACHINE.
APPLICATION FILED NOV. 1, 1911.

1,202,247.

Patented Oct. 24, 1916.
3 SHEETS—SHEET 3.

Witnesses                                    Inventor
                                        Werd W. Turnbull
                            By
                                        C. C. Shepherd
                                                Attorney

UNITED STATES PATENT OFFICE.

WERD W. TURNBULL, OF COLUMBUS, OHIO, ASSIGNOR TO THE TURNBULL MANUFACTURING COMPANY, OF COLUMBUS, OHIO, A CORPORATION.

METHOD AND APPARATUS FOR FEEDING BATTER TO A BAKING-MACHINE.

1,202,247.   Specification of Letters Patent.   Patented Oct. 24, 1916.

Application filed November 1, 1911. Serial No. 657,917.

*To all whom it may concern:*

Be it known that I, WERD W. TURNBULL, a citizen of the United States, residing at Columbus, in the county of Franklin and State of Ohio, have invented certain new and useful Improvements in Methods and Apparatus for Feeding Batter to a Baking-Machine, of which the following is a specification.

My invention relates to a method and apparatus for feeding batter to a baking machine.

It is particularly adapted to the feeding of batter of substantially the consistency required in the making of ice cream cones by a baking machine, but is particularly designed to provide a series of steps and an apparatus for performing such steps which will obviate the ever present dangers due to varying consistencies of the batter and to liability and danger of baking of the portion of batter about to be delivered. One of the most prevalent dangers and serious draw-backs in the feeding of batter to a baking machine, resides in this very feature. For instance, the use of the average pump is practically impossible, owing to the tendency of the batter to bake in the pump before its delivery. It will be readily seen that this is a very serious draw-back and, as a matter of fact, it has up until the present time been the principal argument and the main defect operating against the general adoption of baking machines and particularly of machines for making ice cream cones. Therefore, my invention aims to overcome this and other draw-backs and to insure a definite and ascertained feed of batter with a maximum ease and accuracy.

Figure 1:
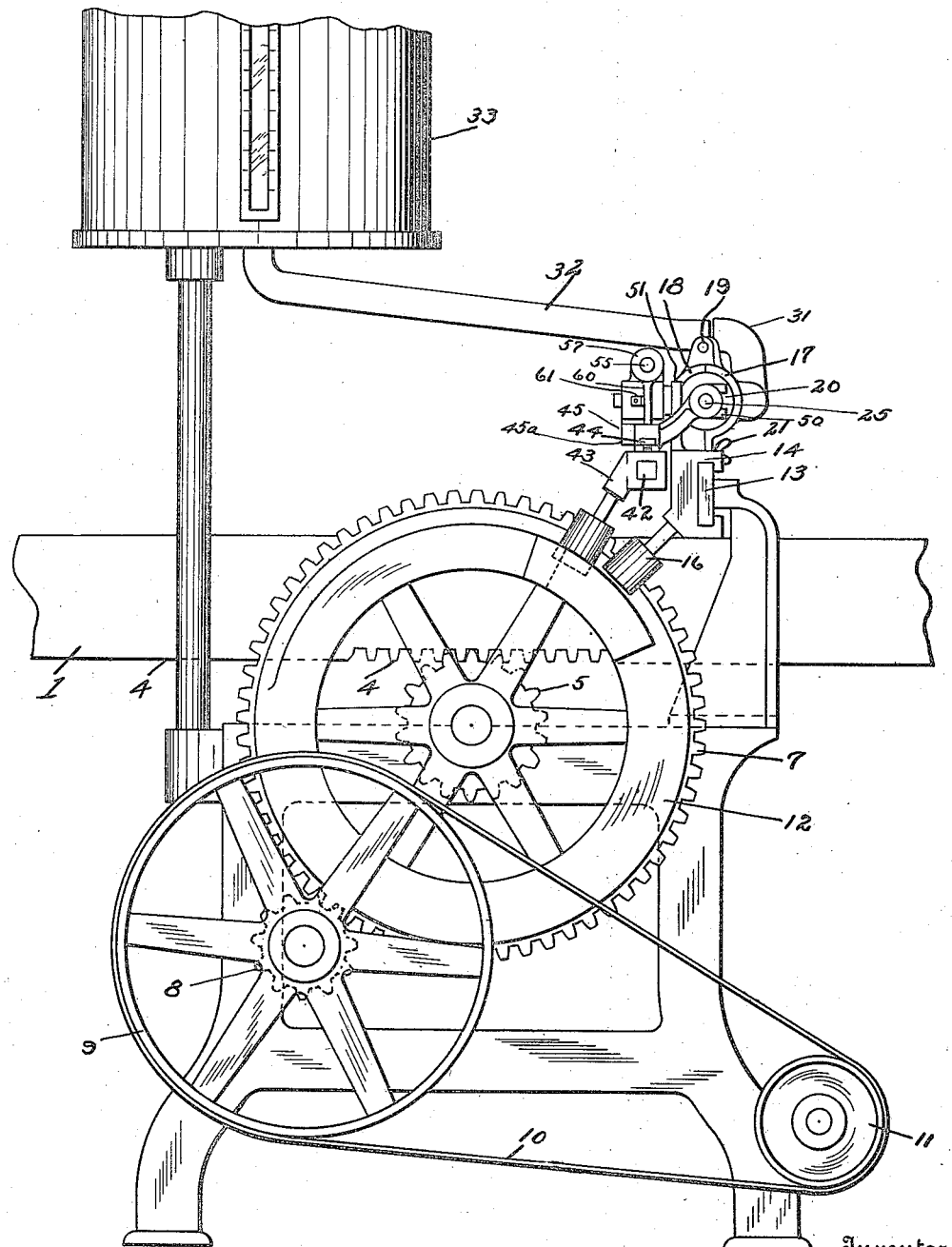
Figure 2:
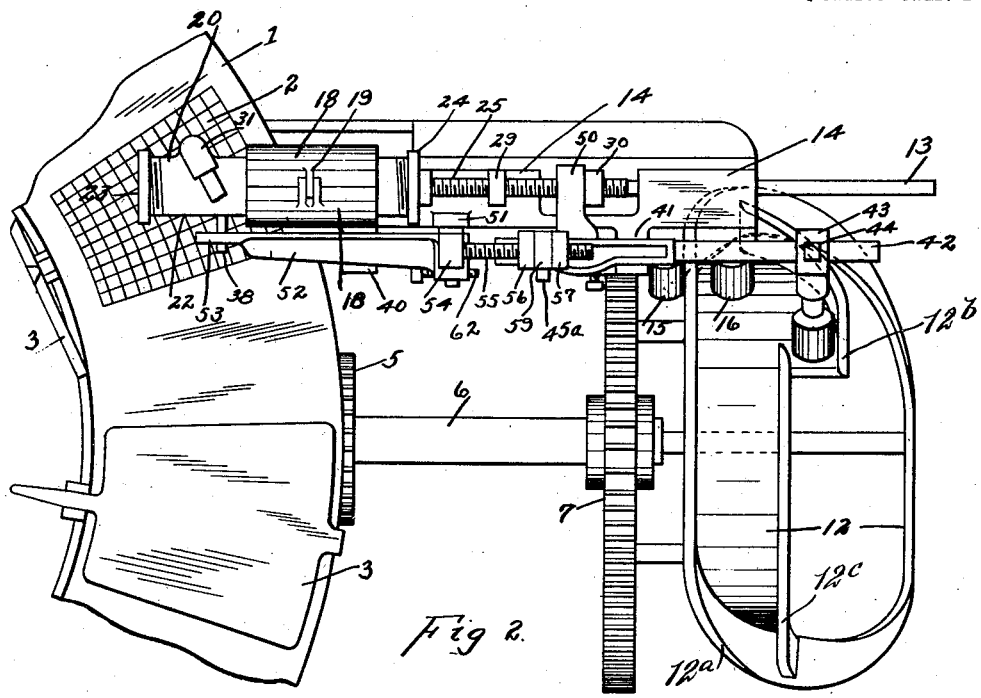
Figure 3:
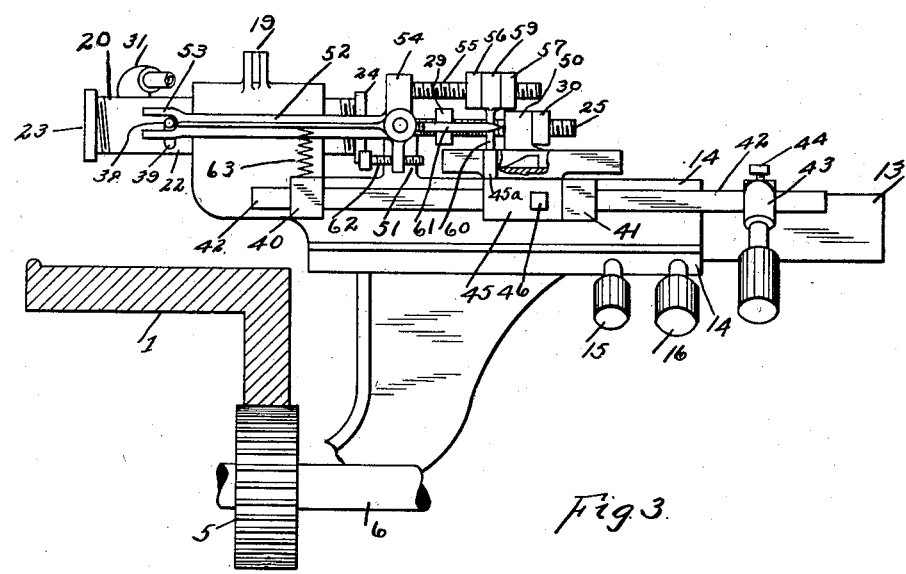
Figure 4:
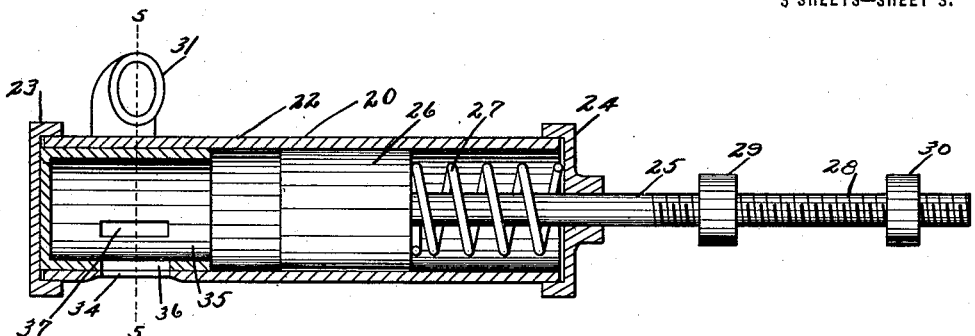
Figure 5:
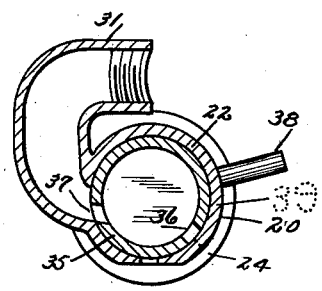
Figure 6:
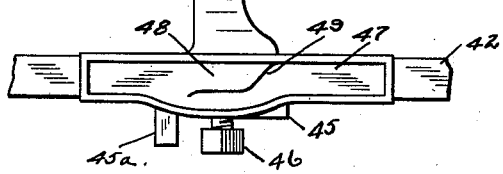
Figures 7, 8:
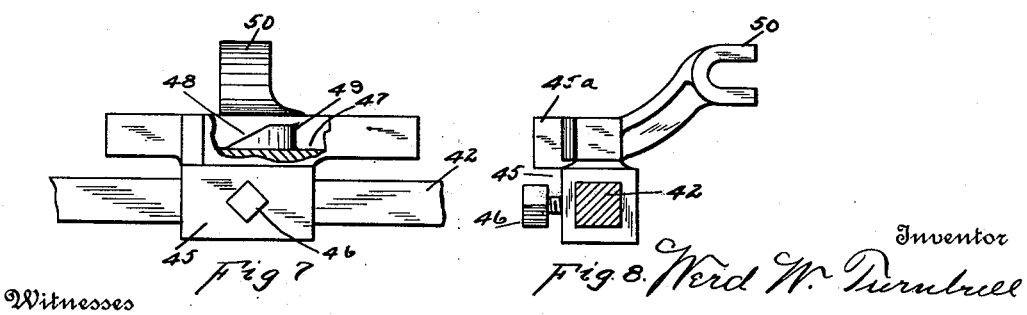

The preferred apparatus for carrying out the essential steps of my method of applying the batter to the successively presented baking plates, is shown in the accompanying drawings, in which similar characters of reference designate corresponding parts, and in which:

Figure 1 is an end elevation of the improved type of pump utilized by me and showing the same working in conjunction with a baking machine of the rotary-ring type, Fig. 2 is a top plan view of my pump structure in its application to the baking machine, Fig. 3 is a side elevation of my pump structure with the controlling elements removed, Fig. 4 is a longitudinal sectional view of the cylinder and piston of my pump cylinder and valve control therefor, and showing the piston mounted therein, Fig. 5 is a section taken on line 5—5 of Fig. 4, Fig. 6 is a detail view in plan of a cam element forming a portion of the operating mechanism for the valve structure, Fig. 7 is a detail view in elevation partially broken away of the structure shown in Fig. 6, and, Fig. 8 is a detail view of a yoke member serving as a medium of transmission of power to the piston of my pump.

In the drawings my pumping apparatus is shown applied to a baking machine comprising a baking ring 1 having regularly disposed baking surfaces 2 thereon and carrying hinged baking plates 3, which may be automatically raised as each baking surface 2 approaches the period of passage beneath the batter feeding apparatus. It will be observed that this baking ring 1 has a rack edge 4 driven by a gear 5 upon a shaft 6 carrying a gear wheel 7. This gear wheel 7 is driven from a source of power by means of a pinion 8, a belt wheel 9, belt 10 and pulley 11. The baking machine shown, is of the form shown in my Patent No. 1,009,355, dated November 21, 1911.

The shaft 6 desirably carries upon its outer extremity a cam element 12 which is in the nature of a double cam having cam ridges 12$^a$, 12$^b$ and 12$^c$ and which coöperates with a pump structure, of such a nature, to be hereinafter described, that the following steps will be performed: The pump cylinder will be positively moved into position above each baking surface 2 as it is presented with the baking plate 3 raised and in such forward movement the valve structure will maintain communication of the cylinder with a source of batter supply. At the same time, the piston will be maintained in a comparatively stationary relation to the pump cylinder. This will produce a partial vacuum in the pump cylinder and together with the natural gravity action of the batter, which may be obtained by the proper location of the batter supply receptacle, a determinate quantity of the batter will be drawn into the pump cylinder, it being understood that the valve structure is at this time effective to shut off any discharge of batter from the cylinder. Further movement of the cam serves to maintain the cylinder stationary and to move the piston forward. During such forward movement, a portion of the batter is forced back into the batter receptacle maintaining a circulatory action and the structure of my pump is such that this portion is regulable as to quantity. At a predetermined instant, mechanism controlled by the double cam, operates to move the valve from a position of normal inlet to an abnormal position of discharge. Further movement of the piston then discharges the batter and mechanism is operated to positively close the valve structure against discharge. The pump is then returned to initial position under control of the double cam.

The basic element of my pump structure is a trackway 13, upon which is slidably mounted a carriage 14 having anti-friction roller elements 15 and 16 extending into cooperative relation with the cam element 12. At the forward end of this carriage there is mounted a clamping element formed in two sections 17 and 18 and hinged together as at 19. These clamping elements serve to grasp and retain the cylinder 20 and are locked in position by a bolt and butterfly nut 21. In the structure shown in the drawings and particularly in Fig. 4, the cylinder is shown as comprising a tubular body 22 having a cap 23 upon one end and a journal cap 24 upon its opposite end for the working reception of a piston rod 25 having a piston head 26 and a spring 27, the purpose of which will be hereinafter described. The piston rod 25 is threaded as at 28 and provided with internally threaded collars 29 and 30 adjustably carried thereon. The tubular body 22 is desirably provided with an angle pipe 31 integrally formed therewith and serving as an inlet pipe constructed to communicate by a hose or other pipe of flexible material 32 with a batter receptacle 33 which is carried upon the baking machine. The tubular body 22 is likewise provided with a discharge orifice 34 and the passage of batter into and from the tubular body 22 is under the control of a cylindrical valve 35 having spaced openings 36 and 37 which individually and alternately communicate respectively with the discharge orifice 34 and the inlet pipe 31. This cylindrical valve carries a pin 38 which protrudes through a slot 39 in the tubular body of the cylinder and is controlled in a manner to be hereinafter described. The walls of the outlet orifice 34 are made comparatively thin by means of the beveling shown in Fig. 5, in order that all danger of caking of the batter at this point will be avoided. Wherever there is a sufficient surface area to support a drop of the batter, there is always danger of baking at that point and the provision of this substantial knife edge eliminates the danger at the point mentioned.

The carriage 14 is provided upon one side with squared journals 40 and 41 for the working reception of a rod 42 carrying an anti-friction element 43 adjustable by means of the set screw 44. This anti-friction element reciprocates the rod 42 under control of the double cam 12. The rod 42 carries an element 45 adjustable because of the set screw 46 and this element 45 is shown best in Figs. 6 and 7. It is of what might be termed a T-shaped formation and is provided upon its upper surface with a trackway 47 which is interrupted by a lug having an upwardly inclined forward surface 48 and a laterally curved rear surface 49. The element 45 is further provided with a lateral yoke extension 50 for embracing the threaded portion 28 of the piston rod 25 and for operating between the adjustable collars 29 and 30, which permit of regulation of the stroke of the piston.

Carried upon the carriage desirably at a point to one side and in the rear of the pump cylinder, is a vertical stanchion 51 upon which is fulcrumed a lever 52 having a yoke 53 extending into embracing relation to the pin 38 of the valve structure. This element 52 is provided with what might be termed a T-head 54 carrying, near one end thereof, a rearwardly extending threaded rod 55 having adjustable collars 56 and 57 and a collar 59 with an integral depending finger 60, such collar 59 being loosely carried upon the rod 55 and adjustable thereon under the control of the collars 56 and 57. The depending finger 60 operates in the trackway 47 and is permitted a slight lateral movement under control of the resilient restraining member 61 which is carried by the lever 52 and is desirably in the form of a leaf spring. The opposite end of the T-head 54, desirably carries a set screw 62 which is longitudinally disposed and adjustable. In addition, the element 52 is maintained in its normal position under the upward pressure of a coiled spring 63.

In actual operation of the structural parts of the pump, the carriage is moved forward under the control of the cam ridge 12ª operating on anti-friction roller elements 15 and 16 of the double cam element 12 and during such forward movement of the carriage, the batter is sucked into the cylinder. In such forward movement and consequent inflow of the batter, the static pressure of the batter upon the piston, is resisted by the spring element 27. Further movement of the cam element moves the rod 42 forwardly by means of anti-friction element 43 controlled by ridge elements 12^b and 12^c and, through the medium of the yoke 50 forces the piston forwardly in the cylinder. By reference to Fig. 2 of the drawings, it will be seen that the cylinder is in the position of deposit, which is in its innermost position, where it has been moved by the coaction of the ridge element 12^a with the rollers 15 and 16. At this time, the element 43 has been brought by contact with the ridge element 12^c into coöperative relation with the ridge element 12^b. Continued rotation of the double cam element 12, causes the anti-friction element 43 to be forced inwardly by such ridge element 12^b, which serves to move the pump piston forwardly. It will be understood by reference to Fig. 1 of the drawing, that the roller 16, while depending into working relation to the ridge element 12^a is not of sufficient length to be effected by the ridge elements 12^b and 12^c, but passes entirely over the same. However, the anti-friction element 43 is directly controlled by the ridge elements 12^b and 12^c and when such anti-friction element 43 leaves the said ridge element 12^b, it passes into contact with and control by the ridge element 12^a which operates by continued rotation of the double cam to move the element 43 and pump piston outwardly. At the same time, the cylinder is being moved outwardly by the ridge element 12^a acting upon the anti-friction members 15 and 16. The regulation is desirably such that, after the piston has forced approximately two-thirds of the batter back into its receptacle, the depending finger 60 working in the trackway 47 comes into contact with the upwardly inclined surface 48 and tilts the element 52 to rotate the valve through the medium of the connection 38 and 53, such valve having been normally held against rotation by the upward pressure of the spring 63 upon the element 52 likewise operating through such connection 38 and 53. Continued forward movement of the rod 42 carries the forward end of the lug 45^a into contact with the set screw 62 and positively returns the element 52 to normal position. At this point, it may be noted that the collars 56, 57 and 59 permit of regulably timing the tilting action of the element 52 and that the set screw 62 permits of regulably timing the positive return of such element 52 to normal position, which happens after the finger 60 has passed the lug having the inclined surface 48. It will thus be seen that it is possible to have a definite and ascertained opening of the valve because of the positive partial rotation and closing operations thereof. Further movement of the cam element causes the carriage and piston to be withdrawn together and in such withdrawal, the depending finger 60 is laterally deflected in its trackway by the laterally inclined surface 49 and because of such deflection against the pressure of the spring 61 is permitted to return to normal position. Upon this return of the elements to normal position, the anti-friction rollers upon the carriage and the piston control are maintained in their proper path by the peculiar structure of the cam element and by their relative lengths as will be seen best in Figs. 1 and 2.

The movement of the discharge pump with relation to the baking surfaces after each discharge operation, has at least two distinct purposes. One of these is to obviate the danger of baking of the batter in the pump. The other, however, is probably the most important and resides in the enabling of the upper irons of the baking machine to drop more rapidly. Experience has demonstrated that the quality of the cones generally deteriorates if one side of the wafer is permitted to bake too much before the other side. Experience has further demonstrated that the deposit of the batter and the maintenance of the upper plate in raised position until it has passed the pump, gives too much time for the wafer to bake upon its underside. This of course refers to that type of pump wherein the pump cylinder is stationary. Therefore, applicant has provided a means for withdrawing his pump so that the upper baking iron may be permitted to descend without loss of time whereby the period of time during which the wafer is upon the baking ring in an uncovered state, is greatly diminished. Therefore, it becomes possible to produce a wafer baked well upon both sides.

A long series of unsuccessful trials has demonstrated that a gravity feed of batter to a baking machine, using the same approximate consistency of batter which is used in cone baking machines, is entirely impractical. This being the case, I claim to be the first inventor of a machine for applying batter to a baking machine by maintaining such batter in a state of compression immediately prior to its discharge. This is particularly important and it is also of considerable importance that the discharge be what may be termed a "flash discharge" in which the opening and closing of the outlet to the batter pump is definite and ascertained and takes place within a comparatively short period of time. This opening and closing is desirably made to occur upon the forward stroke of the piston.

One other important feature of my invention resides in the manner of mounting the same, whereby the pump structure may be readily removed from the machine. In order to successfully operate pumps of this type and to avoid clogging of the pump, as well as the production of unsanitary conditions, it is necessary to remove the pump whenever the machine is stopped for any length of time and to place the same in water or otherwise thoroughly cleanse it.

It will be observed that my invention not only resides in the peculiar structural features outlined, but it resides in the maintenance of a continual circulation or agitation of the selected quantity of batter while in communication with the batter receptacle and because of such circulation and agitation, all danger of baking in the pump is practically obviated. This liability of baking is further decreased by the reciprocatory action of the pump cylinder, which serves to decrease the period of close proximity of the pump to the baking machine. Therefore, I believe that I am the first to solve the difficulty of applying batter to a baking machine.

What I claim, is—

1. The method of feeding a watery unstable batter to a baking machine which consists in agitating such batter immediately preceding each delivery operation.

2. The method of feeding batter to a baking machine which consists in drawing such batter into a pump from a receptacle while the pump outlet is closed and maintaining such pump with its outlet closed in communication with the receptacle during the initial part of its compression stroke.

3. The method of feeding batter to a baking machine which consists in charging a cylinder with such batter from a suitable container and forcing a portion of such selected batter back into the container prior to each discharging operation.

4. The method of feeding batter to a baking machine which consists in charging a cylinder with such batter from a suitable container, and discharging by causing a portion of such selected batter to be positively forced back into the container and a portion to be deposited upon a baking plate.

5. The method of maintaining a uniform consistency of a watery unstable batter adapted to be fed to a baking machine by a pump in communication with a suitable container which consists in maintaining the batter in said container in an agitated state by establishing a flow of the batter from the container into the pump and from the pump back into the container.

6. A machine for feeding batter to a baking machine comprising a depositing element, means for moving said element to a position of discharge over the baking machine, means effective to prevent such movement when said element is properly positioned over said machine, automatic means for discharging a quantity of batter when said element is in such stationary position, and automatic means for withdrawing said element out of close proximity to said baking machine after the discharge.

7. A machine for feeding batter to a baking machine comprising a cylinder, a piston, means for moving said cylinder to a position of discharge over the baking machine and leaving said cylinder stationary in such position, automatic means for moving said piston to expel the batter within said cylinder when the cylinder is in such stationary position, and automatic means for withdrawing said cylinder carrying the cylinder out of close proximity to said baking machine after the discharge.

8. The method of feeding batter to a baking machine which consists in drawing determinate quantities of the batter into an ejector from a receptacle while the ejector outlet is closed, retaining such quantity of the said batter in communication with the batter in the receptacle during a period just preceding feed, forcing a portion of said quantity back into said receptacle while the ejector outlet is closed, cutting off such communication and discharging the remainder of the batter.

9. In combination with a baking machine moving continuously in the same direction, a pump structure normally out of close proximity to said machine, means for automatically moving said pump structure into close proximity to said machine at determinate intervals during its continuous movement, and means for discharging a quantity of batter from said structure when in such position of close proximity.

10. In combination with a baking machine moving continuously in the same direction, a pump structure comprising a cylinder and piston normally out of close proximity to said machine, means for automatically moving said cylinder and piston into close proximity to said machine at determinate intervals during its continuous movement, and means for automatically moving said piston in said cylinder to discharge a quantity of batter when in a position of close proximity to said machine.

11. In combination with a batter delivery receptacle for a baking machine, a pump structure comprising a cylinder, a piston, means for moving said cylinder in a manner to relatively move said piston in said cylinder, and means simultaneously operable with said movement for positively controlling the admission and delivery of batter to and from said pump.

12. In combination with a batter delivery receptacle of a baking machine, a pump structure comprising a cylinder, a piston, an element for operating said piston, a valve device for controlling the admission and discharge of batter to and from said pump, an operating lever for said device, and an element rendered effective by movement of said piston in one direction to operate said lever, said last element and lever being constructed to permit movement of said piston in the opposite direction without effecting said lever.

13. In combination with a batter delivery receptacle of a baking machine, a pump structure comprising a cylinder, a piston, an element for operating said piston, a valve device for controlling the admission and discharge of batter to and from said pump, an operating lever for said device, a finger on said lever yieldable in one direction, and a cam element movable with said piston for operating upon said finger to operate said lever upon movement of the piston in one direction and for passing by said finger upon movement in the other direction.

14. In combination with a batter delivery receptacle of a baking machine, a pump structure comprising a cylinder, a piston, an element for reciprocating said piston, a tubular valve for controlling the inlet and discharge of the batter to and from said cylinder, a fulcrumed lever connected to said valve for rotating the same, an adjustable finger on said lever yieldable in one direction, a cam movable with said piston, said cam being constructed to raise said finger and tilt said lever upon movement in one direction and to pass said finger upon movement in the other direction.

15. In combination with a batter delivery receptacle of a baking machine, a pump structure comprising a cylinder, a piston, a valve, a tilting lever operatively connected to said valve, a finger carried by said lever, a cam movable with said piston for tilting said lever, said cam and finger being of a form to permit return movement of said piston without operating said lever, and means for positively returning said lever to normal position.

16. A baking machine comprising a plurality of baking units movable continuously in the same direction, said units being formed of superimposed plates and capable of a relative separation, a batter discharge pump, means for discharging a quantity of batter upon one plate of each unit during its movement as it is presented and when the complemental plate of the unit has been relatively separated, and means for withdrawing said pump after each discharge out of possible interference with said units during the closure of the plates thereof.

17. A baking machine comprising a horizontally continuously rotatable element, a plurality of hinged plates carried thereby, a batter discharge pump, means for discharging a quantity of batter upon said element as it is presented to a position beneath said pump with a hinged plate in upright position, and means for automatically withdrawing said pump after each discharge out of possible interference with said hinged plate in its closing movement upon such discharged batter as said element moves along.

18. In combination with a batter delivery receptacle of a baking machine, pump structure comprising a cylinder, a piston, means for reciprocating said cylinder, means for reciprocating said piston, said two means being normally operative for holding said piston stationary during the advance of said cylinder, and means for adjusting the relative timing of such reciprocatory movements.

19. In combination with a batter delivery receptacle of a baking machine, a pump structure comprising a cylinder, a piston, a valve, means for reciprocating said cylinder, means for reciprocating said piston, said two means being operative for withdrawing said piston and cylinder relatively and also operative for returning said piston when the cylinder is stationary to effect a discharge, and means operating said valve to discontinue said discharge.

20. In combination with a batter delivery receptacle of a baking machine, pump structure comprising a cylinder, a piston, a valve controlling the admission and discharge of batter to and from said cylinder and normally in admission position, and a double cam controlled structure for advancing said cylinder while said piston is stationary, subsequently advancing said piston and operating said valve.

21. In combination with a batter delivery receptacle of a baking machine, pump structure comprising a cylinder, a piston, a valve for normally admitting batter to said cylinder and cutting off the discharge, means for advancing said cylinder while said piston is stationary, means for advancing said piston, and mechanism operative upon the advance of said piston to move said valve to a position to shut off admission of said batter to said cylinder and permit discharge.

22. In combination with a batter delivery receptacle of a baking machine, pump structure comprising a cylinder, a piston, a valve for normally admitting batter to said cylinder and cutting off the discharge, means for advancing said cylinder while said piston is stationary, means for advancing said piston, mechanism operative upon the advance of said piston to move said valve to a position to shut off admission of said batter to said cylinder and permit discharge, and means for returning said valve to normal position.

23. In combination with a batter delivery receptacle of a baking machine, pump structure comprising a cylinder, a piston, a valve for normally admitting batter to said cylinder and cutting off the discharge, means for advancing said cylinder while said piston is stationary, a spring in said cylinder to the rear of the piston, means for advancing said piston, and mechanism operative upon the advance of said piston to move said valve to a position to shut off admission of said batter to said cylinder and permit discharge.

In testimony whereof I affix my signature in presence of two witnesses.

WERD W. TURNBULL.

Witnesses:
 WALTER E. L. BOCK,
 A. L. PHELPS.